May 27, 1958 W. S. ROEDER 2,835,986
MANIPULATIVE APTITUDE TEST APPARATUS
Filed Jan. 16, 1953
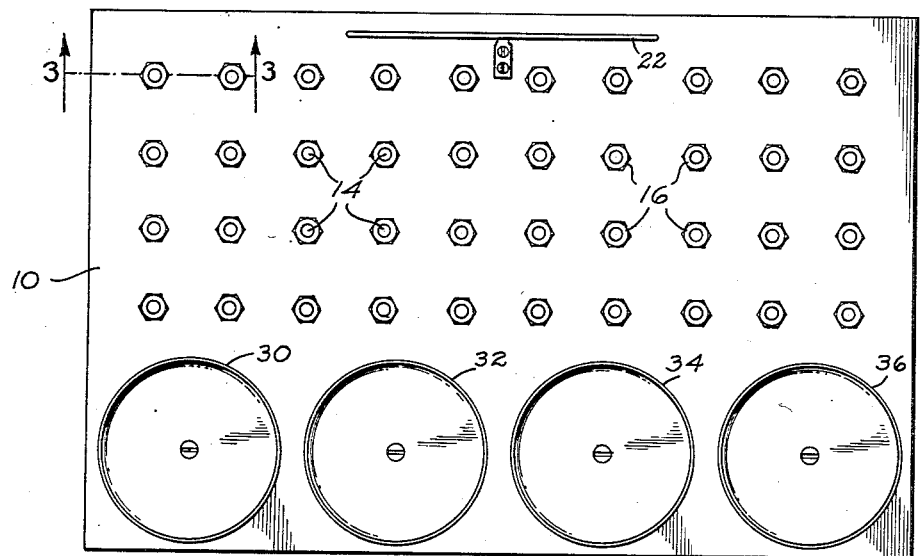
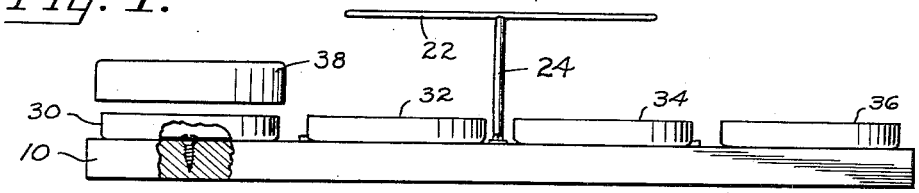
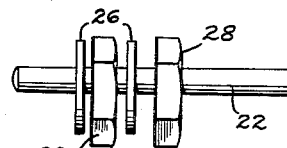
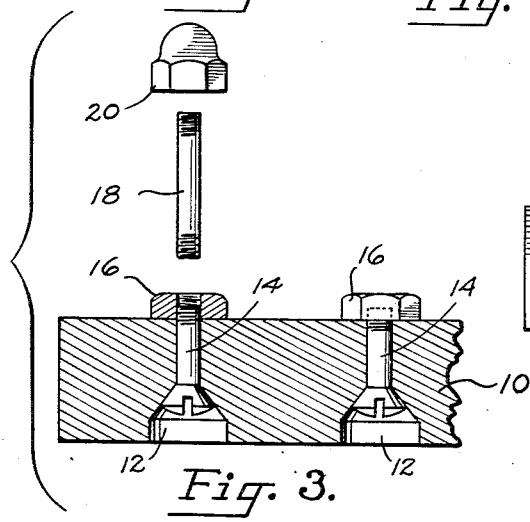
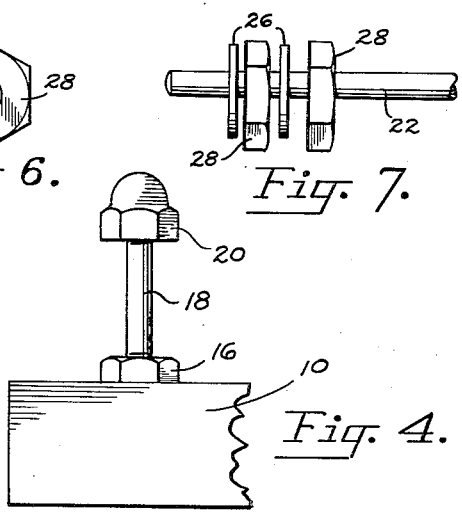
INVENTOR.
Wesley S. Roeder
BY
Atty.

United States Patent Office 2,835,986
Patented May 27, 1958

2,835,986

MANIPULATIVE APTITUDE TEST APPARATUS

Wesley S. Roeder, Portland, Oreg.

Application January 16, 1953, Serial No. 331,575

2 Claims. (Cl. 35—13)

This invention relates to manipulative aptitude test apparatus of the class designed for testing the suitability of individuals for employment in trades where manual dexterity is a primary requirement.

Trades and occupations which employ automobile mechanics, airplane mechanics, radio repairmen, electricians, machinists, machine operators, typists, and similar personnel, require manual dexterity in assembling and disassembling apparatus, and in the precision placement and fitting together of parts. They also require speed and dexterity in executing certain movements with the hands, arms and fingers, particularly thrust movements and twisting movements.

Furthermore, they require the ability to select proper machine parts from a group of parts differing in type and size. Still further, they require a certain ability to follow either printed or verbal instructions.

The presently described test apparatus is designed to provide in a single apparatus means for testing all of the foregoing aptitudes quickly, conveniently and accurately. The manner in which this is accomplished will be apparent from the following specification and claims considered together with the drawings wherein:

Figure 1 is a plan view of the presently described manipulative aptitude test apparatus;

Figure 2 is a view in side elevation of the apparatus of Figure 1;

Figure 3 is a fragmentary sectional view taken along the lines 3—3 of Figure 1;

Figure 4 is a fragmentary view in side elevation of the apparatus of Figure 1, illustrating one manner of its operation and use;

Figures 5 and 6 are plan views of elements employed together with the apparatus of Figure 1; and Figure 7 is a fragmentary view in side elevation illustrating the manner of application of the elements depicted in Figures 5 and 6.

As is apparent from the drawings the manipulative aptitude test apparatus of my invention comprises a board 10 which may be of any desired size, shape and material. It is perforated with a plurality of transverse perforations 12 arranged in a predetermined pattern and countersunk on the underside.

Within each of the perforations is seated a bolt 14 of sufficient length so that its threaded end extends a spaced distance outwardly from the upper face of the board. Nuts 16 are affixed to each of the bolts, being dimensioned so that they will not screw completely on the bolt but rather will leave threaded sockets on the face of the board. In this manner there are provided threaded sockets adapted to receive threaded members of corresponding diameter.

Such members are provided in the form of the rods 18 which are threaded on both ends. One end then may be inserted into the threaded sockets provided by the nuts 16 as is illustrated in Figure 4.

Further associated with the threaded rods are the cap nuts 20. These are externally threaded and dimensioned to be screwed with one quick twist on the free ends of rods 18.

Also mounted on board 10 is a T-bar 22 which includes the vertical standard 24 affixed to the top surface of the board. Rod 22 is designed to receive a plurality of perforated members such as the washers 26 and the perforated elements 28. These may be arranged in any desired pattern on the bar, for example, in an alternating pattern as is illustrated in Figure 7.

Also provided are receptacles for receiving the various removable elements of the assembly, i. e. rods 18, cap nuts 20, washers 26 and the perforated sliding elements 28. Such receptacles are indicated at 30, 32, 34 and 36. They are fastened to the top surface of the board in convenient relationship to each other as well as to the threaded sockets formed by nuts 16 and bar elements 22. Covers 38 may be provided for each of these receptacles which therefore furnish a readily accessible means for receiving the demountable parts of the assembly.

The test apparatus described herein is operated in the following manner:

First the board is placed before the candidate. At a given time signal he picks up the threaded rods 18 and the cap nuts 20 and one at a time, progressing from left to right along the horizontal rows of threaded sockets, he first screws one of the rods with a quick twist into a socket and then caps it by screwing on a cap nut with another quick twist. This procedure is continued until the preselected test time has expired. The number of units which he has assembled during this time may comprise his raw score.

Next, in a separate time period, or if desired, in the same time period, the testee may pick up washers 26 and perforated elements 28 from their respective receptacles and slide them one at a time in any desired sequence on T-bar 22. If desired, this operation involving a thrust motion, may be alternated with the above described operation of assemblying the threading elements, which involves a screwing or twisting motion. At the end of the test period the number of washers and perforated elements mounted on the bar may be counted and used to designate the testee's raw score.

As a further variation, if desired, the assembly of threaded elements illustrated in Figure 4, and the assembly of perforated elements illustrated at Figure 7, may be disassembled in a given sequence. This further tests the manual dexterity of the testee and also tests his sorting ability.

Thus it will be apparent that by the present invention I have provided a versatile test apparatus the component parts of which cooperate to test thoroughly the manual dexterity of individuals and hence their aptitude for certain trades. Thus it tests their ability to assemble and disassemble apparatus, to fit and place parts precisely, to select parts of different types and sizes rapidly and accurately, to assemble them using both quick thrusting and twisting or screwing motions, and to sort out and separate different elements of apparatus from each other.

Also, and of substantial importance, it tests the ability of the testee to follow verbal instructions. Still further, the apparatus is versatile and adaptable for use with individuals of varying degrees of training and intelligence. This is possible because of the cooperation of the different elements of the apparatus, enabling revision of the test procedure to suit the particular individual to be tested.

It is to be understood that the form of my invention herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. Manipulative aptitude test apparatus comprising a board having transversely therethrough a plurality of perforations arranged in a predetermined pattern, a plurality of bolts seated one in each of the perforations with their threaded sections extending outwardly from the top surface of the board, a plurality of nuts threaded one on each of the bolts and having threaded openings dimensioned to provide threaded sockets when fully mounted on the bolts, a plurality of rods threaded on both ends and adapted to be screwed one in each of the sockets, a plurality of cap nuts adapted to be screwed one one each of the rods, a horizontal bar, a standard attached centrally to the bar for supporting the same on the board, a plurality of washers adapted to be strung on the bar, a plurality of perforated members adapted to be strung on the bar together with the washers in a preselected pattern, and a plurality of receptacles fastened to the board for the separate reception of the rods, the cap nuts, the washers and the perforated members.

2. Manipulative aptitude test apparatus comprising a board having transversely therethrough a plurality of perforations arranged in a predetermined pattern, a plurality of bolts seated one in each of the perforations with the threaded sections extending outwardly from the top surface of the board, a plurality of nuts threaded one on each of the bolts and having threaded openings dimensioned to provide threaded sockets when fully mounted on the bolts, a plurality of rods threaded on both ends and adapted to be screwed one in each of the sockets, a plurality of cap nuts adapted to be screwed one on each of the rods, a horizontal T-bar mounted on the board, and a plurality of differently shaped perforated elements adapted to be mounted on the bar in a preselected pattern.

References Cited in the file of this patent

UNITED STATES PATENTS

| | | |
|---|---|---|
| 2,339,074 | Hogan | Jan. 11, 1944 |
| 2,377,100 | Patterson | May 29, 1945 |

FOREIGN PATENTS

| | | |
|---|---|---|
| 531,455 | Great Britain | Jan. 3, 1941 |

OTHER REFERENCES

"Psychological and Physiological Apparatus and Supplies," Catalogue of the C. H. Stoelting Co., 424 North Homan Ave., Chicago, Illinois; Received in Scientific Library on August 6, 1930; pages 183, 185 and 186.